(12) United States Patent
Gabrielson et al.

(10) Patent No.: US 8,051,864 B1
(45) Date of Patent: Nov. 8, 2011

(54) PORTABLE BLIND DECOY TREKKING POLE

(76) Inventors: Cory Gabrielson, Shasta Lake, CA (US); Jeffery Ervin, Round Mountain, CA (US)

(*) Notice: Subject to any disclaimer, the term of this patent is extended or adjusted under 35 U.S.C. 154(b) by 79 days.

(21) Appl. No.: 12/698,675

(22) Filed: Feb. 2, 2010

Related U.S. Application Data

(60) Provisional application No. 61/222,221, filed on Jul. 1, 2009, provisional application No. 61/177,902, filed on May 13, 2009.

(51) Int. Cl.
*A45B 21/00* (2006.01)
(52) U.S. Cl. ............... 135/16; 135/17; 135/66; 135/901
(58) Field of Classification Search .................... 135/16, 135/17, 19, 66, 76, 96, 901; 43/1–3
See application file for complete search history.

(56) References Cited

U.S. PATENT DOCUMENTS

| | | | | |
|---|---|---|---|---|
| 4,214,770 A | * | 7/1980 | Agins | 280/819 |
| 4,590,699 A | | 5/1986 | Nicks | |
| 4,733,681 A | * | 3/1988 | Lee | 135/16 |
| 4,790,338 A | * | 12/1988 | Strobl | 135/16 |
| 5,214,872 A | * | 6/1993 | Buyalos, Jr. | 43/1 |
| 5,522,168 A | | 6/1996 | Friddle | |
| 5,572,823 A | | 11/1996 | Savaria | |
| 5,687,946 A | * | 11/1997 | Cho | 248/530 |
| 5,749,386 A | * | 5/1998 | Samuel, Jr. | 135/16 |
| 5,787,632 A | | 8/1998 | Kraut | |
| 6,223,759 B1 | * | 5/2001 | Flippin, Jr. | 135/34.2 |
| 6,296,005 B1 | | 10/2001 | Williams | |
| 6,510,861 B1 | * | 1/2003 | Mead | 135/16 |
| 7,344,320 B2 | * | 3/2008 | Barker et al. | 396/419 |
| 2009/0211617 A1 | * | 8/2009 | Montecucco | 135/98 |

FOREIGN PATENT DOCUMENTS

CH 636006 A * 5/1983

* cited by examiner

*Primary Examiner* — Noah Chandler Hawk
(74) *Attorney, Agent, or Firm* — QuickPatents, Inc.; Kevin Prince

(57) ABSTRACT

A combination trekking pole and blind is disclosed. When in a collapsed configuration, the trekking pole facilitates a user traversing challenging terrain. The combination can quickly be expanded into a blind configuration with an expanding camouflaged umbrella arrangement for concealing the user from the view of hunted game.

12 Claims, 3 Drawing Sheets

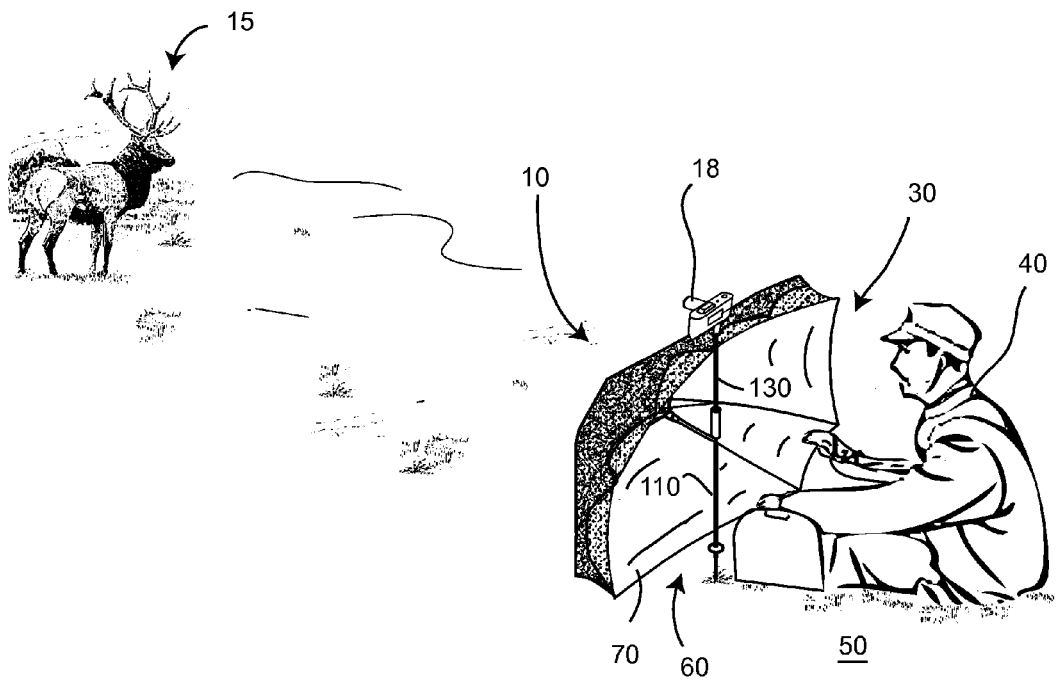
FIG. 1
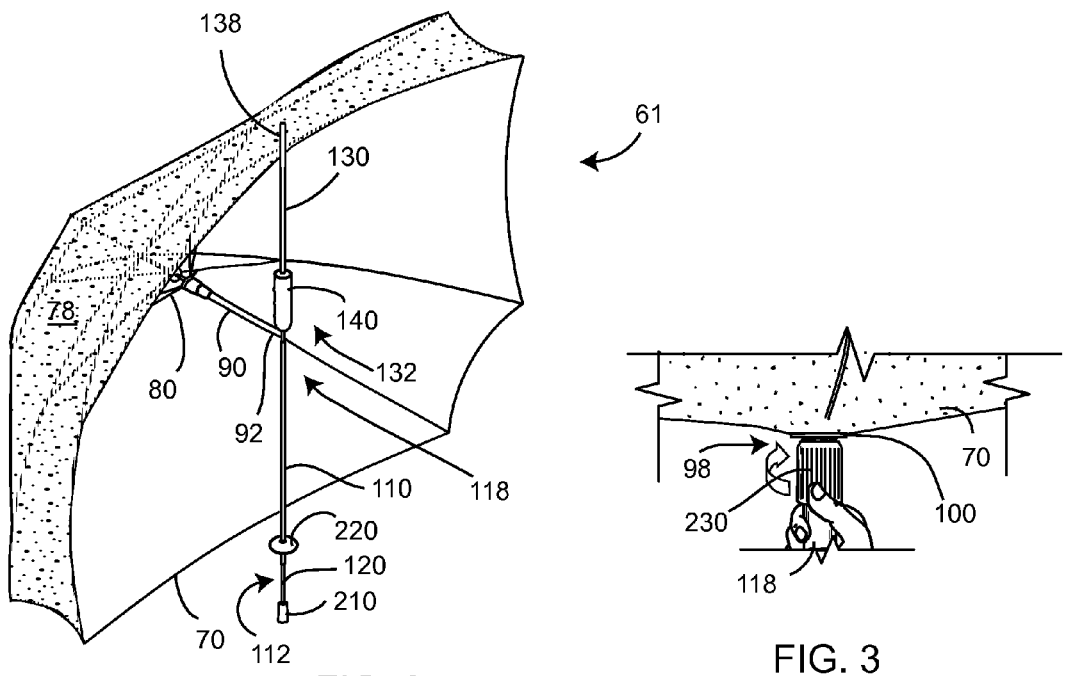
FIG. 2
FIG. 3

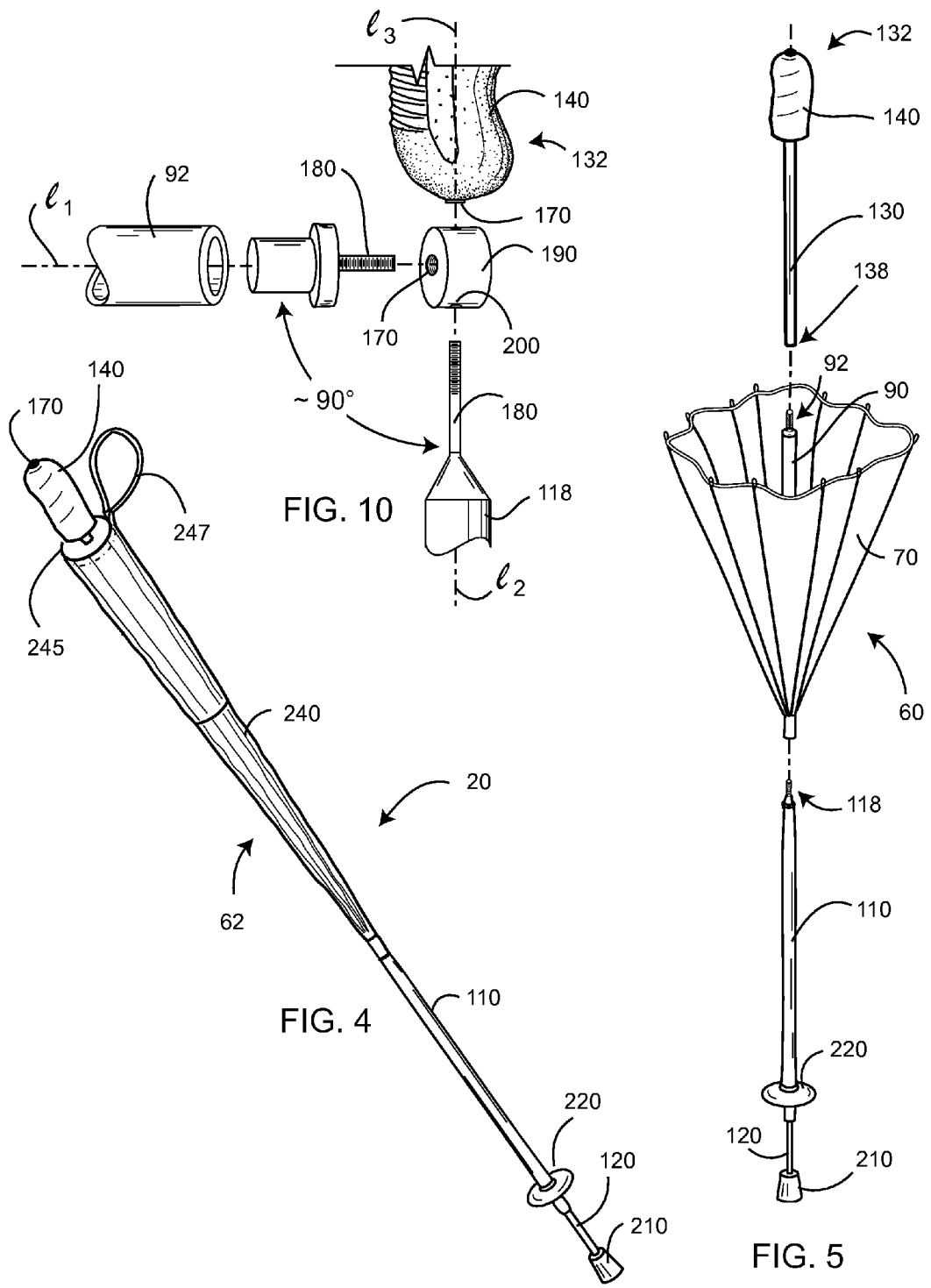

PORTABLE BLIND DECOY TREKKING POLE

CROSS-REFERENCE TO RELATED APPLICATIONS

This application claims the benefit of U.S. Provisional Patent Application 61/222,221, filed on Jul. 1, 2009, and U.S. Provisional Patent Application 61/177,902, filed on May 13, 2009, both of which are incorporated herein by reference.

STATEMENT REGARDING FEDERALLY SPONSORED RESEARCH AND DEVELOPMENT

Not Applicable.

FIELD OF THE INVENTION

This invention relates to portable blinds or decoys and hiking aids, and more particularly to a combination trekking pole and blind or decoy.

DISCUSSION OF RELATED ART

Blinds and decoys follow a variety of designs and functions that range from portable and collapsible boxes or tents to full-standing permanent enclosures that require trucks to transport. Some blinds require substantial time and expertise to assemble and disassemble. It is understood that sportspersons need a portable blind or decoy to more effectively hunt game because certain game quickly stops moving or suddenly enters into flight mode. Additionally, sportspersons would benefit from a portable hunting blind or decoy that could also assist with traversing terrain.

Nature observers would also benefit from being able to carry an easily portable blind that can assist with hiking. Trekking poles can assist hikers traverse terrain, but are ineffective when attempting to observe an animal that can be easily startled. With a portable blind that also aids with walking, nature observers can hike more challenging terrain and more easily conceal themselves from animals.

Although there are myriad designs for blinds or decoys, there are no effective, portable blinds or decoys available to the public that can also be configured as a trekking pole. The prior art includes U.S. Pat. Nos. 4,590,699; 5,214,872; 5,522,168; 5,572,823; 5,787,632; and 6,296,005, demonstrating a continuing set of improvements over the prior art.

U.S. Pat. No. 4,590,699 to Nicks discloses a foldable and collapsible game decoy. Similar to a collapsible personal fan, the invention disclosed by Nicks simulates an image of the body of the game on the outer side of the decoy. The decoy additionally includes a three-dimensional head of the game at the center of the outer side of the decoy. While portable and easily collapsible, the disclosed invention cannot also act as a hunting blind, nor can it assist in traversing terrain while hunting or hiking.

U.S. Pat. No. 5,214,872 to Buyalos et al. discloses an adjustable umbrella blind. The blind claimed by Buyalos et al. can be used to protect a person from rainfall and can also act as a collapsible blind to conceal a person. While the blind disclosed by Buyalos et al. can protect a person from rainfall and effectively conceal a person, it does not assist with traversing terrain as a trekking pole.

U.S. Pat. No. 5,522,168 to Friddle discloses a decoy that is a collapsible molded head on a backing sheet. Friddle discloses a three-dimensional frontal view of the decoy via rubber latex or other materials that simulates the decoy, and does not utilize a collapsible two-dimensional layer. Moreover, the invention disclosed by Friddle is not easily portable, nor does it assist in traversing terrain while hiking or hunting.

U.S. Pat. No. 5,572,823 to Savaria discloses a hand-held decoy and hunter shield. The decoy disclosed by Savaria includes a planar member contoured in the form of a game fowl silhouette held by a person observing or hunting fowl. The decoy effectively conceals a sportsperson or nature observer because the person holding the decoy is not observable behind the game fowl silhouette. The disclosed invention is not easily collapsible, its cumbersome planar member reduces its portability, and carrying the invention makes hiking or walking more difficult.

U.S. Pat. No. 5,787,632 to Kraut discloses a portable decoy blind for hunting or observing geese. Kraut discloses a dome-shaped goose shell simulating the body of a goose that a hunter or observer lies under while hunting or observing fowl. The invention disclosed by Kraut does not easily collapse, is not easily portable, and is limited to simulated fowl and not other game. Moreover, the invention claimed by Kraut does not assist with hiking and cannot provide functionality as a blind.

U.S. Pat. No. 6,296,005 to Williams et al. discloses a collapsible hunting blind apparatus. The hunting blind to Williams claims a shaft with an expandable surrounding outer layer that collapses around the shaft similar to an umbrella. The utility of the patent to Williams focuses on the collapsible functionality of a hunting blind but fails to address portability and whether the device can be used as a trekking pole to assist while traversing terrain.

Therefore, there is a need for a device that allows sportspersons and nature observers to traverse terrain while at the same time carry a lightweight portable decoy or blind that can quickly expand and collapse. The present invention accomplishes these objectives.

SUMMARY OF THE INVENTION

The present device is a collapsible portable decoy or blind that also easily collapses into a trekking pole to assist a sportsperson or nature observer with traversing terrain.

As will be discussed in more detail, the focus of the present invention is to provide a trekking pole that also provides functionality as a portable blind or decoy. The trekking pole can expand an outer layer outward as a decoy or blind element that is designed and colored to resemble or appeal to a species of wild game or camouflage. When collapsed, the outer layer also collapses and folds into the trekking pole. When facing game the outer layer functions to conceal the objects behind the blind so that the game believes the observable outer layer of the decoy apparatus is not a threat.

When fully collapsed, the portable blind also performs as a trekking pole that does not need to be broken apart and stored separately. When fully collapsed, the trekking pole has complete functionality and can support the weight of a person using the pole to assist when traversing hills and inclines.

One goal of the present device is to provide a blind or decoy that can be quickly assembled and disassembled by sportspersons or nature observers hunting or observing animals.

It is another goal of the present device to provide an effective hunting blind for sportspersons or nature observers to conceal themselves while hunting or observing various animals.

It is another goal of the present device to serve as a lightweight blind or decoy that can be easily carried by one person.

It is another goal of the present device to increase the accessibility of terrain that a sportsperson or nature observer can traverse while hunting game or hiking.

Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a perspective view of a device of the invention in use as a blind;

FIG. 2 is a perspective view thereof deployed and configured as a blind;

FIG. 3 is a perspective view a trekking pole clamp adaptor;

FIG. 4 is a perspective view of the device collapsed and configured as a trekking pole;

FIG. 5 is an exploded view thereof;

FIG. 10 is an exploded view of an umbrella shaft adaptor.

DETAILED DESCRIPTION OF THE PREFERRED EMBODIMENT

Figure 6:
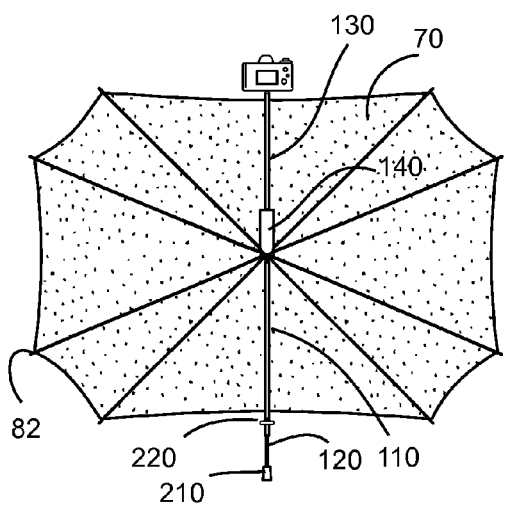
FIG. 6 is a rear elevation view thereof.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. Any use of the word "means" herein is intended to invoke means-plus-function limitation in accordance with 35 U.S.C. §112, sixth paragraph, even if the word "means" follows words describing the function.

The present invention is a combination 10 trekking pole and hunting blind. In the preferred embodiment of the present invention an umbrella 60 or other collapsible apparatus includes a flexible fabric section 70. Fabrics for the flexible fabric section 70 may include polyester, polyurethane-polyurea copolymer elastane, polyvinylchloride, polytetrafluoroethylene, or other water resistant organic or synthetic compounds and combinations thereof.

FIG. 1 is a view of the present invention during use in a blind 30 configuration that shows the flexible fabric section 70 adapted to slide up and down the umbrella 60 using an umbrella runner and rib mechanism 80 into an expanded 61 or collapsed 62 position. The umbrella shaft 90 is defined as having a proximal end 92 and a distal end 98 terminating into a ferrule 100.

The umbrella runner and rib mechanism 80 that slides along the umbrella shaft 90 defines a first longitudinal axis $L_1$. When the combination 10 is placed in the expanded position 61 and placed in front of a user 40 the invention conceals a user 40 from the line of sight of game 15 looking toward the user 40. The combination 10 can then be easily placed into its collapsed position 62 into a trekking pole configuration 20 without requiring substantial time for disassembly.

The trekking pole configuration 20 of the present invention includes a trekking shaft 110 with a lower end 112 and upper end 118 that defines a second longitudinal axis $L_2$. The upper end 118 of the trekking shaft 110 is easily adaptable to attach to a ferrule 100 of the umbrella 60 to bring the longitudinal axis $L_2$ of the umbrella shaft 90 into co-alignment with the second longitudinal axis $L_2$ of the trekking shaft 110. A camera 18, telescope (not shown), or the like can be mounted to the upper end 118 of the trekking shaft 110. A ground spike 120 may be attached to the lower end 112 of the trekking shaft 110 for facilitating the securing and stabilizing the blind 30.

The preferred embodiment of the present invention may also include a handle section 130 having a proximal end 132 and a distal end 138, the handle section 130 defining a third longitudinal axis $L_3$ (FIG. 10). The proximal end 132 terminates with a grip 140 that is configured to receive and align longitudinally with the upper end 118 of the trekking shaft 110 and longitudinally orthogonal with the proximal end 92 of the umbrella shaft 90. The grip 140 may be constructed of rubber, foam, plastics, wood, metals, or other suitable grip materials that provide a sufficient means to grasp the handle 130 section.

FIG. 2 also shows the invention in the blind 30 configuration. When configured as a blind 30 the umbrella 60 is in the expanded position 61, and the proximal end 132 of the handle section 130 is orthogonally fixed with the proximal end 92 of the umbrella shaft 90 and longitudinally aligned and attached with the upper end 118 of the trekking shaft 110. The distal surface 78 of the flexible fabric section 70 of the umbrella 60 attaches to the rib mechanism 80 of the umbrella 60 and expands into the blind configuration 30.

The ground spike 120 ensures that the combination 10 can be placed securely in the ground surface 50.

Preferably, when configured as a trekking pole 20 (FIGS. 4 and 5) the distal end 138 of the handle section 130 is fixed to the proximal end 92 of the umbrella shaft 90 and mutually aligned with the upper end 118 of the trekking shaft 110 that is itself connected to the ferrule 100 of the umbrella 60. When the umbrella 60 is in a collapsed 62 position, the combination 10 acts as the trekking pole 20 so that a user 40 can grasp the handle section 130 and the ground-penetrating spike 120 can be contacted with the ground surface 50 to improve traction of the user 40 therealong. Alternately, an elastomeric foot 210 may be selectively attached to the ground-penetrating spike 120 when penetrating the ground surface 50 with the spike 120 is not desired.

Further, the combination 10 may also receive a flexible protective cover 240 with an aperture 245 at both ends for covering the umbrella 60 when the combination 10 is collapsed in the trekking pole 20 configuration. The flexible protective cover 240 protects the flexible fabric section 70 and the elastic cover 150. FIG. 5 shows an exploded view of the invention when configured as a trekking pole 20.

It is contemplated that at least one aperture of the protective cover 240 can include an additional draw string arrangement 247 or one or more closure members, such as cooperating strips of hook-and-loop material, or the like, to secure the protective cover 240 around the handle 130 section.

In one embodiment of the present invention, the ferrule 100 and the distal end 98 of the umbrella shaft 90 can telescopically receive the upper end 118 of the trekking shaft 110. The trekking pole 20 and the ferrule 100 can then be selectively lockable via a clamping mechanism 230 (FIG. 3), such as a twistable threaded shaft arrangement or the like. The clamping mechanism 230 secures the trekking pole 20 or blind 30 so that it does not collapse or come apart during use.

The combination 10 can also receive a flexible cover 150 adapted for selective attachment to a distal surface 78 of the flexible fabric section 70 of the umbrella 60 that expands 61 via the protruding ribs 82 of the rib mechanism 80. Fabrics for the flexible cover 150 may include polyester, polyurethane-polyurea copolymer elastane, polyvinylchloride, polytetrafluoroethylene, or other water resistant organic or synthetic compounds and combinations thereof. Preferably the flexible cover 150 is at least partially elastic, and made from a combination of at least 80% polyester and not more than 20% Lycra, for example. A printed image 155 of game, camouflage, or the environment are examples of possible images that may be applied to the flexible cover 150. FIG. 6 is a rear elevated view of the combination 10 in the blind configuration 30 wherein the spike 210 and the stop 220 are attached to the trekking shaft 110, and the trekking shaft 110 is attached to the grip 140 and handle section 130. The flexible cover 150 is illustrated as a modified octagon, however any suitable shape of flexible cover 150 may be used.

Figure 7:
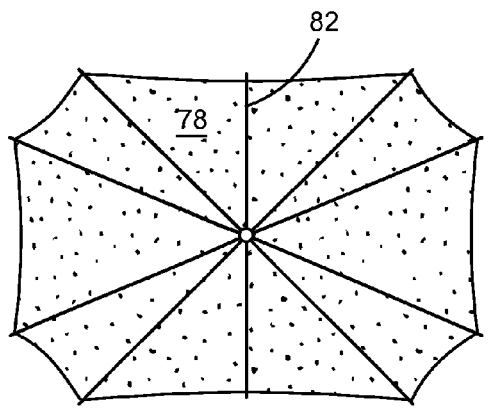
FIG. 7 is a front elevation view thereof.
Figure 8:
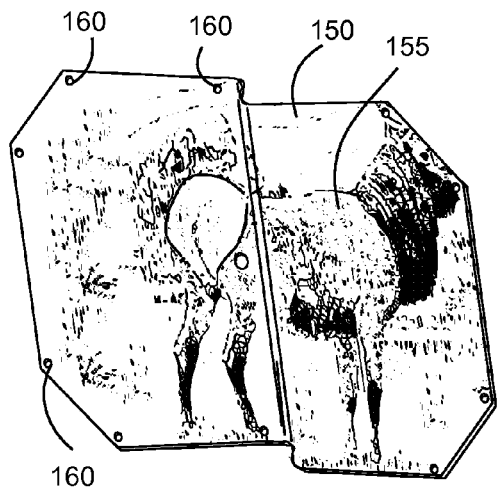
FIG. 8 is decoy blind cover of the invention.
Figure 9:
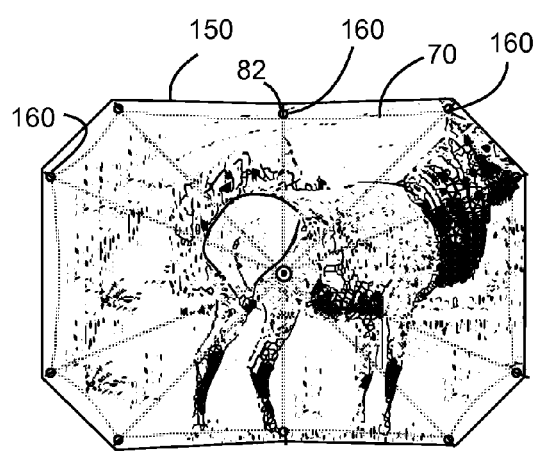
FIG. 9 is front elevation view of the device with a decoy cover attached.

To strengthen the attachment of the flexible cover 150 to the distal surface 78 of the flexible fabric section 70, the cover 150 can include one or more apertures 160 that are adapted for placement over the protruding ribs 82 of the rib mechanism 80 to hold the flexible cover to the flexible fabric section 70 of the umbrella 60. FIG. 7 shows a front view of the ribs and the attached distal surface 78 of the flexible fabric section 70 of the umbrella 60. FIG. 8 shows a flexible cover 150 with a printed image 155 and apertures 160. FIG. 9 illustrates the flexible cover 150 in the expanded position 61 attached via the apertures 160 to the flexible fabric section 70 of the umbrella 60.

The combination 10 can also be configured wherein both the ferrule 100 of the umbrella shaft 90 and the proximal end of the handle 130 section include a longitudinally aligned threaded aperture 170 that attaches with a longitudinally aligned threaded connector 180 at the upper-end of the trekking shaft (FIG. 10). The proximal end 92 of the umbrella shaft 90 also includes a longitudinally aligned threaded connector 180 for attachment with either a longitudinally aligned threaded aperture 170 of the distal end 138 of the handle 130 section or an orthogonally aligned threaded aperture 170 of the proximal end 92 of the handle section 130.

Such an embodiment additionally includes a shaft adapter 190 that may be fixed between the proximal end 132 of the handle section 130 and the upper end 118 of the trekking shaft 110 at an aperture 200 therethrough when configured as a blind 30. The shaft adapter 190 also includes the orthogonally aligned threaded aperture 170 that is fixed with the proximal end 92 of the umbrella shaft 90. The present configuration can also be modified so that the shaft adapter 190, when in the trekking pole 20 configuration, is fixed between the ferrule 100 of the umbrella and the upper end 118 of the trekking shaft 110. FIG. 10 is an exploded view of the umbrella shaft adapter 190 showing three longitudinal axes $L_1$, $L_2$, and $L_3$ and how each connects to the combination 10 to form the umbrella shaft 90.

To prevent the ground penetrating spike 120 from penetrating the ground surface 50, which is not desirable in some circumstances, the selectively removable foot 210 may be attached to the ground-penetrating spike 120 (FIGS. 2, 4 and 5). The foot 210 may be stored at the proximal end 132 of the handle section 130 (not shown).

In another embodiment of the present invention, the combination 10 may include a stop 220 fixed proximate to the lower end 112 of the trekking shaft 110 and projecting radially away therefrom. Use of a stop 220 prevents the spike 120 from penetrating so far into the ground surface 50 that use of the combination 10 in the trekking pole configuration 20 is hindered.

While a particular form of the invention has been illustrated and described, it will be apparent that various modifications can be made without departing from the spirit and scope of the invention. For example, various shaft-attaching mechanisms other than threaded shafts and apertures may be utilized, without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A combination trekking pole and hunting blind, comprising:
   an umbrella comprising a flexible fabric section adapted to be moved with an umbrella runner and rib mechanism between an expanded and a collapsed position, and an umbrella shaft having a proximal end, a distal end terminating in a ferrule, and defining a longitudinal axis thereof, the umbrella runner adapted to slide along the umbrella shaft between each end thereof;
   a trekking shaft having a lower end, an upper end, and defining a longitudinal axis thereof, the upper end thereof adapted to be selectively attached with the ferrule of the umbrella to bring the longitudinal axes of the umbrella shaft and the trekking shaft into mutual co-alignment, the lower end of the trekking shaft terminating in a ground-penetrating spike;
   a handle section having a proximal end, a distal end, and defining a longitudinal axis thereof, the proximal end terminating in a grip and configured for selective longitudinally co-aligned attachment with the upper end of the trekking shaft and longitudinally orthogonal attachment with the proximal end of the umbrella shaft;
   such that in a trekking pole configuration with the distal end of the handle section fixed to the proximal end of the umbrella shaft, and with the upper end of the trekking shaft fixed with the ferrule of the umbrella, all mutually longitudinally co-aligned, and with the umbrella in the collapsed position, the combination may be used as a trekking pole such that a user may grasp the grip of the handle section and the ground-penetrating spike may be brought into contact with a ground surface;
   and such that in a blind configuration with the umbrella in the extended position, the proximal end of the handle section orthogonally fixed with the proximal end of the umbrella shaft and longitudinally co-aligned and fixed with the upper end of the trekking shaft, the ground penetrating spike may be inserted into the ground surface for stability.

2. The combination of claim 1 further including a flexible, elastic cover adapted for selective attachment to a distal surface of the flexible fabric section of the umbrella.

3. The combination of claim 2 wherein the cover includes a plurality of apertures adapted for placement over protruding ribs of the umbrella runner and rib mechanism to hold the cover to the flexible fabric section of the umbrella.

4. The combination of claim 2 wherein the cover is made from a polyurethane-polyurea copolymer elastane material.

5. The combination of claim 1 wherein both the ferrule of the umbrella shaft and the proximal end of the handle section each include a longitudinally-aligned threaded aperture for attachment with a longitudinally-aligned threaded connector of the upper end of the trekking shaft, and wherein the proximal end of the umbrella shaft includes a longitudinally-aligned threaded connector for attachment with either a longitudinally-aligned threaded aperture of the distal end of the handle section or an orthogonally-aligned threaded aperture of the proximal end of the handle section.

6. The combination of claim 5 further including a shaft adapter that, when the combination is in the blind configuration, may be fixed between the proximal end of the handle section and the upper end of the trekking shaft at an aperture therethrough, the shaft adapter further including the orthogonally-aligned threaded aperture that is fixed with the proximal end of the umbrella shaft.

7. The combination of claim 6 wherein the shaft adapter, when the combination is in the trekking pole configuration, may be fixed between the ferrule of the umbrella and the upper end of the trekking pole.

8. The combination of claim 1 further including a foot that is selectively removable between the ground-penetrating spike when the combination is in the trekking pole configuration, and the distal end of the handle section when the combination is in the blind configuration.

9. The combination of claim 1 further including a stop fixed proximate the lower end of the trekking shaft and projecting radially away therefrom.

10. The combination of claim 1 wherein the upper end of the trekking shaft is selectively telescopically received by the ferrule and the distal end of the umbrella shaft, the trekking pole and the ferrule being selectively lockable with a clamping mechanism.

11. The combination of claim 1 further including a flexible protective cover having an aperture at both ends thereof for covering the umbrella when the umbrella is in the collapsed position and the combination is in the trekking pole configuration.

12. The combination of claim 11 wherein at least one of the apertures of the protective cover includes a draw string arrangement for tightening the aperture around the handle section.

* * * * *